March 6, 1973     R. W. REDINGTON ET AL     3,718,955
METHOD OF MANUFACTURING SEMICONDUCTOR CAMERA TUBE TARGETS
Filed Sept. 19, 1960
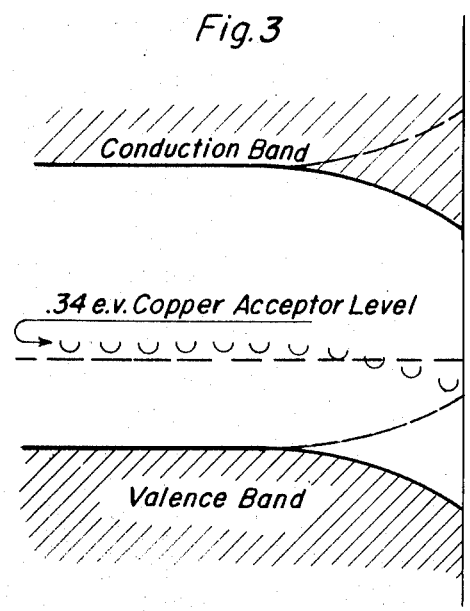
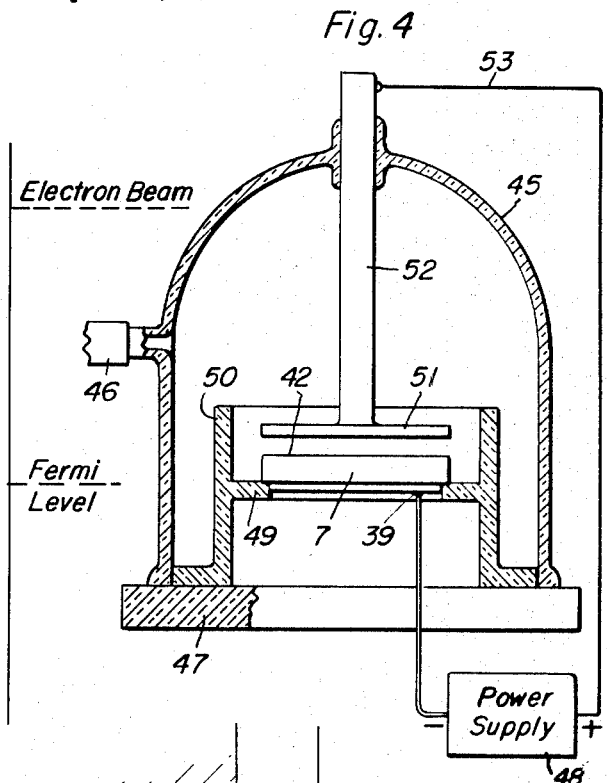
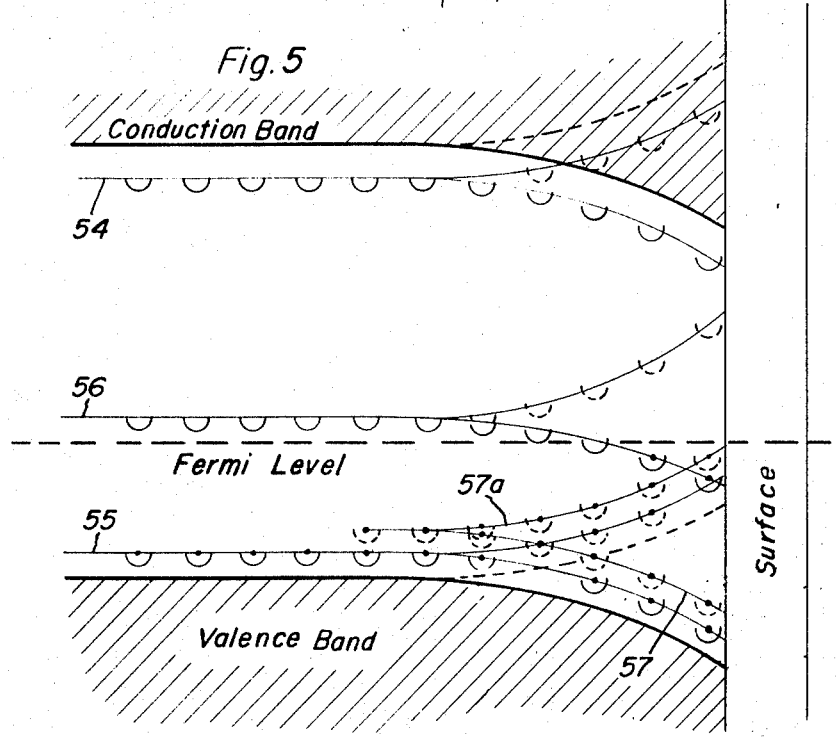
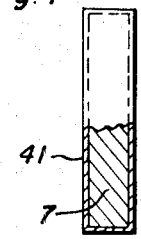
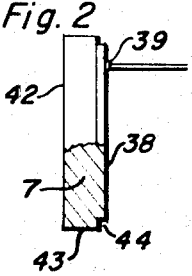
Inventors:
Rowland W. Redington;
Pieter J. Van Heerden,
by Richard R. Brainard
Their Attorney.

United States Patent Office 3,718,955
Patented Mar. 6, 1973

3,718,955
METHOD OF MANUFACTURING SEMICONDUCTOR CAMERA TUBE TARGETS
Rowland W. Redington and Pieter J. van Heerden, Schenectady, N.Y., assignors to General Electric Company
Filed Sept. 19, 1960, Ser. No. 56,799
Int. Cl. H01j 9/20
U.S. Cl. 29—25.11                           11 Claims This invention relates to a method of manufacturing semiconductor camera tube targets and particularly to such a method for increasing the effectiveness thereof.

Certain semiconductor materials exhibit photoconductive properties, and therefore may be suitably employed for targets in television-type camera tubes. In a vidicon-type tube, for example, illumination is received on one side of a semiconductor target through a relatively positive transparent electrode contacting the semiconductor surface. The reception of illumination creates free charge carriers in the semiconductor at the points illuminated. Either an electron or hole may constitute a carrier which may pass through or part way through the target to establish a photocurrent. The photocurrent reduces the voltage drop across the photoconductive layer in the illuminated area to make the opposite target surface, exposed to a scanning electron beam, more positive. At the instant when the illuminated picture element is scanned by an electron beam, just enough electrons are deposited by the scanning beam to replace the negative charge removed in the preceding frame period by photoconduction. The instantaneous charge build-up, capacitively coupled to the transparent electrode, constitutes the picture signal output in the ordinary vidicon.

Semiconductor materials of both the intrinsic or extrinsic type may be utilized as a photoconductive material in a camera tube target, a main consideration being the illumination wave length which is to be detected. The "extrinsic" materials are so named because certain impurities are added to the semiconductor. Semiconductors of this type are frequently more useful for detecting illumination or radiation at longer wavelengths, for example, in the infrared region.

The use of extrinsic semiconductor targets is convenient to detection in the infrared region because such impurities may be added which create energy levels in the semiconductor which lie in close proximity to "energy bands" associated with the semiconductor. Thus an electron may be excited by infrared radiation from the semiconductor stable energy state or "valence band" to a shallow acceptor level provided by added impurity material, the acceptor energy level corresponding in its "energy" distance above the valence band to the energy radiation in the infrared region. A conducting "hole" may thereby be freed in the semiconductor valence band, acting as the current carrier for the photoconductive target.

Unfortunately extrinsic semiconductor materials heretofore employed for photoconductive targets have exhibited a very severe defect due to an unexplained "non-imaging" state wherein the detected scene blurs or "runs," resulting in an enormous decrease in resolution after a short period of operation. This "non-imaging" state is more or less permanent in that it reoccurs each time the apparatus is used to detect an image.

It is therefore an object of the present invention to provide a photoconductive camera tube target employing extrinsic semiconductor target material which has an extended and practical operating life.

It is another object of this invention to provide an improved photoconductive camera tube target of increased extended sensitivity.

It is another object of this invention to provide a manufacturing method for photoconductive camera tube targets which will prevent the non-imaging state thereof.

It is another object of this invention to provide an improved photoconductive camera tube target sensitive to infrared radiation and an improved method of manufacturing the same.

We have discovered that the non-imaging state in extrinsic semiconductor target camera tube targets is due to lateral electric conduction along the scanned target surface. We believe this sidewise conduction is fostered by a potential barrier near this surface of the semiconductor and have likewise discovered that the potential barrier and the attendant sidewise conduction may be eliminated by providing a semiconductor surface layer which is at least as strongly the same polarity type as the interior of the semiconductor. For example, when the semiconductor is p-type, a surface layer is provided which is nearly, or preferably at least, as p-type as the rest of the semiconductor body.

In accordance with an aspect of our invention, the surface layer polarity is altered by bombarding the semiconductor surface, intended to be oriented towards the tube's electron beam, with relatively high momentum noble gas ions. After such bombardment the non-imaging surface condition is substantially permanently eliminated and the target can be freely handled or even cleaned with appropriate solutions without harming its desirable polarity properties.

In accordance with another aspect of the present invention the extrinsic semiconductor target is manufactured by selecting an arsenic or antimony dope germanium semiconductor and then adding copper to the semiconductor, to the extent that the latter material nearly balances the initial n-type impurity in atomic percentage. Manufacturing is accomplished by coating a body of this n-type germanium with copper, heating the coated body so that this metal diffuses into the semiconductor while the arsenic or antimony diffuse out the edges, and removing the metal coating by appropriate means. The diffused semiconductor is then cut down in size except for one surface thereof, which will form a good electrical contact. The latter surface is used for both a reference electrode when bombarding the target with high momentum noble gas ions and also as the relatively transparent target connection on the side of the semiconductor target opposite the electron beam in a vidicon-type arrangement.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is an enlarged elevational view, partially in cross-section, of the semiconductor target coated with metal, specifically copper;

FIG. 2 is an enlarged elevational view, partially broken away, of the target with the metal coating removed and with portions of the semiconductor material removed;

FIG. 3 is an energy diagram for the untreated semiconductor target surface;

FIG. 4 is a cross-sectional view of apparatus for bombarding the semiconductor target with charged particles; and FIG. 5 is an energy diagram for the semiconductor target material including the various impurity levels both before and after surface treatment.

A camera tube target in accordance with the present invention is formed of extrinsic semiconductor material, that is semiconductor material which contains certain specified impurities in order to render it suitably conductive or photoconductive. In accordance with a specific embodiment p-type semiconductor material is employed as an infrared detecting target wherein such target is initially formed from semiconductor material which is at first n-type. For example, n-type germanium, containing arsenic or antimony impurities, then has added to it a quantity of copper metal which approximately balances the said arsenic or antimony in atomic percentage. Lower "energy states" of the copper impurity act to compensate or "trap" the electrons from the higher energy state of the n-type donor (arsenic or antimony) material. This action is more fully described subsequently.

The resulting compensated material is then effectively of the p-type having a usable acceptor level at approximately .34 electron volt above the germanium "valence band" shown in the FIG. 5 energy diagram, and described in connection therewith. Then when a quantum of radiation strikes the semiconductor, an electron may be raised thereby from the top of the valence band to the .34 electron volt level, this energy differential corresponding to radiant energy excitation of about 4 microns in wavelength, that is, radiant energy in the usable infrared spectrum. A conducting hole is then left in the valence band. Of course electrons excited from slightly below the top of the valence band will correspond to slightly shorter wavelengths, etc. It therefore follows that a semiconductor target with this impurity acceptor level will be sensitive to and receive energies in the infrared radiation region.

Copper as a p-type impurity, in addition to providing an energy level appropriate to infrared detection, provides sufficient electron mobility and sufficient dark current resistivity, particularly at low temperatures, to function well in a photoconductive target. The dark current resistivity of the copper doped or copper impurity containing germanium employed increases from about one ohm-centimeter at room temperature to greater than $10^{12}$ ohm centimeters at the boiling temperature of liquid nitrogen.

The extrinsic type, that is the doped or impurity containing type, semiconductor has further advantages as a target material; targets of such material may be made thicker than would an intrinsic or non-doped semiconductor material. The thickness of any photoconductive camera tube target is normally limited either by the requirement that the radiation be approximately homogenously absorbed or that the thickness be less than the range of the photogenerated charge carriers. The limits are very short for many materials and thus the thickness is often limited in the case of conventional intrinsic semiconductors to thicknesses on the order of one radiation length. However, with an extrinsic semiconductor, quanta of radiation absorbed as they pass through the target may be regulated by the effective amount of impurity added in the material. Therefore an extrinsic photoconductor target may be thicker than an intrinsic photoconductor. The added thickness decreases the target's capacitance from one surface to the other making its response quicker, and increases the allowable overall size and effective sensitivity of the target by as much as 10 times over what an intrinsic target sensitivity would be for the same allowable amount of capacitance lag or "stickiness."

The semiconductor target may be constructed in accordance with one feature of the present invention by copper plating a slightly oversized target wafer blank of commercially available n-type germanium, containing an arsenic or antimony impurity. The target blank 7 is illustrated in FIG. 1 including a copper coating 41. The plated blank is heated or roasted for approximately a day or two allowing the metal to diffuse into the semiconductor blank. The temperature at which this heating is carried out is determined by the initial amount of n-type impurities, i.e., the arsenic or antimony, initially included in the semiconductor blank, as conveniently determined for example by Hall effect measurements. It is desired to add enough copper impurity by the heat-diffusion process to balance off the n-type impurity with approximately 95% or so as much copper acceptor metal by atomic percentage. The amount of metal added by the heating process is understood to be a function of the temperature at which the process is carried out and is therefore determined from solid solubility curves of a metal in a semiconductor, e.g., copper in germanium. For such a chart reference may be had to page 86, vol. 105, Physical Review, Jan. 1, 1957, "Triple Acceptors in Germanium" by H. H. Woodbury and W. W. Tyler. While the copper diffuses into the semiconductor, the n-type impurity diffuses out somewhat at the surface. Since arsenic and antimony have appreciably smaller diffusion constants than copper, only a thin layer near the surface is depleted of the n-type impurity.

After the coated semiconductor blank is heated for a day or two, the copper plating is peeled off or removed by hydrofluoric acid and the back side of the wafer or side which is to be oriented towards the electron beam in a camera tube is surface-etched or undercut in some other manner to remove a layer where the n-type impurity has diffused out somewhat. Such undercut area is numbered 42 in FIG. 2. The undercutting may be conveniently accomplished with a solution known as CP–4 consisting of hydrofluoric acid and nitric acid. The edges 43 are similarly undercut and an edge portion of the back side of the semiconductor blank which is to be oriented toward the front of the tube is similarly removed as at 44, leaving only area 38 remaining where the arsenic or antimony has diffused out somewhat, leaving a copper heavy contact area. This area serves as the target's transparent electrode. A lead may be soldered to the electrode as at 39. A camera tube construction appropriate for cooperating with the present target for detection of radiation is set forth and claimed in our copending concurrently filed application Ser. No. 56,798, now abandoned, as well as our divisional application Ser. No. 344,155, filed Jan. 2, 1964.

Unfortunately, a tube and extrinsic semiconductor target even constructed in the above manner ordinarily operates successfully for short periods of time only, after which a blurring effect occurs. We attribute this short period of satisfactory operation to the presence of surface currents on the back side of the target or side oriented towards the electron beam. It is further postulated that the surface conduction is in turn caused by a barrier potential near the surface of the semiconductor.

The theory connected with the present invention will be described with reference to the energy chart illustrated in FIG. 3, showing "energy levels" for electrons in a germanium semiconductor and including its back surface layer, which is to be scanned by an electron beam, at the right. Energy is shown as increasing in a vertical direction for electrons and decreasing for holes, and the horizontal distance from right to left roughly indicates the distance of such energy distribution from the surface of the semiconductor. In this diagram the valence band represents a group of energy levels for stable germanium electrons in the non-excited semiconductor. The conduction band on the other hand is a group of normally empty levels to which electrons must be excited in an intrinsic semiconductor in order for conduction to take place. The Fermi level is that statistical level below which energy levels are most likely to be filled with electrons and above which most energy levels are likely to be empty of electrons. The gap or forbidden zone between the conduction band and the valence band indicates a usual complete absence of electrons or levels having corresponding energies in the intrinsic semiconductor.

The same diagram applies to extrinsic semiconductors except copper levels are added to which electrons may be excited by light quanta. To review semiconductor physics, extrinsic semiconductors are characterized as to polarity type depending upon the primary current carrier present. In general, two types of conduction occur in extrinsic semiconductors, depending upon the impurity added, i.e., conduction of electrons in n-type semiconductors, and conduction of holes in p-type semiconductors. The polarity type may be ascertained from the energy diagram where the relatively closer proximity of the conduction band to the Fermi level indicates n-type material wherein conduction will take place via electrons moving in the conduction band, while proximity of the valence band to the Fermi level indicates p-type material wherein conduction will take place via positive holes moving in the valence band. In the specific example, an extrinsic copper metal doped germanium is the semiconductor employed, rendering the material effectively p-type, and therefore conduction will take place primarily by movement of holes along energy levels in the valence band from left to right towards the back surface, these holes having been created by quanta of light falling upon the semiconductor opposite surface exciting electrons to an acceptor level.

Now it is known that in germanium p-n junctions the contact potential difference between the n-type and the p-type material is much smaller than the energy band gap or "forbidden energy zone." This implies that near a semiconductor surface the energy band structure of n-type germanium bends up and that of p-type germanium bends down. Since the impurity doped semiconductor employed as a target in the specific example is of the p-type, the band structure of this p-type material bends down near the surface thereof; and it is possible that relatively positive surface states exist on the crystal surface due possibly to individual surface atoms introducing energy levels in the vicinity of, but not too far below the normal position of the Fermi level which would be filled in the neutral atom. This type of surface induces a relatively negative space charge layer near the surface in the area where the energy bands bend down, producing a retarding field for holes or barrier in this region. We have discovered that this band distortion is the cause of the non-imaging state encountered with extrinsic semiconductor target tubes.

The bending down of the band structure may be thought of as representing a potential hill which is difficult for the positive hole to cross, and further may be thought of as indicating a semiconductor surface only weakly of the same polarity type as the semiconductor interior inasmuch as the current-carrier-containing bands bend away from the Fermi level.

In the specific example, positive holes created by radiation quanta tend to pile up at the relatively negative barrier, creating a dipole layer, and these holes consequently never reach the surface scanned by the electron beam in a camera tube. The non-imaging state of extrinsic semiconductor tubes is then due to the sidewise conduction or diffusion of these holes near the surface which cannot reach the electron beam side of the target and cannot therefore establish the necessary condition for proper imaging, i.e., the condition where the electrons and holes recombine as fast as they arrive.

If there are hole traps in the surface region, the polarization will not at first produce the non-imaging state since the offending holes will at first be trapped, but once these hole traps are all filled, then additional polarization leaves free holes in the valence band near the surface resulting in the surface conductivity that produces the non-imaging state. The non-imaging state is then spread by sidewise diffusion of these holes.

In accordance with the present invention we have further discovered that this non-imaging state is prevented or eliminated by providing a target back surface layer near to being the same polarity type as the interior of the semiconductor, as distinguished from the surface band distortion of the usual semiconductor which may be characterized as indicating a surface layer quite a bit weaker in polarity than the interior. When the semiconductor is made more nearly the same polarity, the energy bands tend to straighten out or bend the other way, reducing or eliminating the potential hill. We have additionally discovered that such surface layer may be provided by subjecting the target surface to bombardment with relatively high momentum noble gas ions. For example the surface layer of a p-type semiconductor target may be so bombarded.

An apparatus for accomplishing this bombardment is illustrated in FIG. 4 wherein a glass bell 45 is supplied with noble gas, for example, helium gas at a pressure of a few mm. Hg, through tube 46. Bell 45 is supported upon a glass base 47. The target blank 7 having a contact 39 soldered onto the copper diffused side thereof is electrically connected to the negative side of D-C power supply 48, the flat semiconductor target blank 7 being supported in the bell 45 on an annular quartz ledge 49, and surrounded by a quartz supporting cylinder 50 extending upwardly beyond ledge 49. A flat horizontal electrode 51 is aligned in spaced relation to target blank 7 and is secured to an electrode post 52 passing through the top of the bell and connected by means of lead 53 to the positive end of power supply 48. The power supply is adjusted to deliver voltage between 250 and 600 volts D-C, which will cause a discharge of helium ions in the bell, away from electrode 51 towards surface 42 of target blank 7. The device is spaced and adjusted to produce a current density in the range of 1–5 milliamps per square centimeter. The discharge is mantained for approximately 15 minutes.

The resulting semiconductor surface layer is rendered at least as p-type as the semiconductor interior by this treatment and the surface layer is quite stable despite handling, exposure to oxygen for short periods, rinsing in common solvents such as water, acetone, coating with polystyrene coatings, etc. The treatment is effective in permanently preventing the non-imaging state in targets thus treated. Tubes with such targets have been operated for extended periods of time without ill effects.

The bombardment is effective in raising the right hand energy band boundaries as illustrated by the dashed extensions in FIG. 3, indicating an upward bending of the energy bands. It is understood that some improvement would be experienced in raising the bands to a lesser degree, for example in producing a level or nearly level condition. The latter may be accomplished by bombarding for a much shorter period of time. In the present example the bands are raised to bend upwardly and the surface layer in the vicinity of the former space charge or potential hill is rendered at least as p-type as the interior of the semiconductor. Thus the highly desirable condition of no barrier is produced.

The energy distribution mechanism for establishing a surface layer polarity so that the non-imaging state does not occur is more fully illustrated in FIG. 5 showing an energy diagram similar to the one shown in FIG. 3 and specific to copper doping, for illustrative purposes. Energy states indicated generally at 54 in this figure illustrate the donor energy states of an n-type impurity, i.e., the arsenic or antimony originally found in the semiconductor of the specific embodiment. In the original n-type semiconductor these energy states 54 would contain electrons, easily excitable the short distance to energy levels in the conduction band for supporting n-type conduction therein. However, in accordance with one aspect of the present invention, the semiconductor material has been changed to effectively p-type, by the addition of copper. The energy states then produced by the copper, which is added in quantity sufficient to obtain an atomic percentage of copper approximately equal to the original n-type impurity, produces energy states at 55 and 56 in FIG. 5. These energy states are at .04 volt and .34 volt levels, respectively, above the valence band. Electrons formerly contained in energy states 54 drop, for the most part, to energy states 55 of the acceptor metal, filling those states at points interior to the semiconductor. However, the additional energy states 56 of the copper metal are left vacant, for the most part, and represent a level above the valence band to which electrons may be conveniently raised by the energy of approximately 4 micron infrared radiation. Electrons deeper in valence band, raised to energy states 56, will correspond in energy change to infrared radiation striking the semiconductor at slightly shorter infrared radiation wavelengths. A good response is therefore secured by such a semiconductor target in the range between 1½ and 4½ microns, a range which is not highly absorbed by the atmosphere and which may be therefore used conveniently for infrared detection, i.e., in viewing of objects giving off heat.

The presence of the differential combination of donor and acceptor levels described above tends to produce the general energy level configuration relative to the Fermi level shown in the FIG. 5 chart; that is, the valence band will be closer to the Fermi level than the conduction band, particularly at points interior to the semiconductor, indicating an effectively p-type material with energy states 56 acting as an empty acceptor level slightly above the Fermi level. However, in the surface layer at the right where the various levels bend downward, the level of states 56 falls below the Fermi level and states 56 will be filled in this region. Conducting positive holes travelling towards the right surface in the valence band will be prevented from reaching the surface due to the retarding field indicated by this downward curvature of the valence band and will pile up immediately to the left thereof, forming a dipole layer near the surface. This will result in near-surface conduction of holes producing the undesirable non-imaging state.

The dashed energy band and energy state levels in the FIG. 5 chart on the other hand represent the energy picture after the bombardment with noble gas ions. It is postulated that such a bombardment penetrates the semiconductor to approximately the area of the aforementioned space charge or potential hill, knocking semiconductor atoms out of their proper lattice sites and resulting in the addition to this region of shallow energy states numbered 57 in the diagram. These energy states receive electrons from the right hand portion of energy states 56 and all energy states rise as indicated by the dashed lines whereby again empty energy states occur above the Fermi level and filled ones below. Induced shallow energy states 57, caused by the bombardment, rise to position 57a, It is seen that in this area of induced states 57a, the semiconductor has become at least as strongly the same polarity, e.g., as strongly p-type, as the interior of the semiconductor since the valence band is in fact closer to the Fermi level near the surface. As a consequence, no barrier is encountered by holes travelling from left to right in the valence band and thus no layer of holes will be built up near the surface. It has been found that creating his surface layer, more nearly the same polarity type as the semiconductor interior, eliminates cross-conduction and therefore prevents running or blurring of the image. The response of the tube is therefore drastically improved.

While the FIG. 5 diagrams show the energy bands and levels bent upwardly as a result of the bombardment, it is again understood the levels need only be relatively straightened to secure a surface layer as strongly the same polarity type as the interior. Moreover, some improvement may be had by merely raising the levels somewhat above what they would be in the untreated state, i.e., by making the surface more strongly of the same polarity to some degree, but weaker than the interior. The bombardment time may be shortened to produce these somewhat less advantageous results.

Although in the illustrative embodiment the target 7 has been described as a p-type semiconductor, e.g., germanium appropriately doped with copper, and although such a construction has particular advantages especially in the infrared region, it is apparent that other extrinsic semiconductor materials may be utilized. For example, silicon may be similarly employed as the semiconductor. In the specific example a copper acceptor metal dope is added to the germanium, but other dopings resulting in appropriate conductivity characteristics may be used, depending upon the frequency spectrum responses desired and the basic semiconductor invovled. Other dopings suitable for germanium are certain elements in addition to copper, such as zinc, platinum, gold and silver and also the transition metal elements, iron, cobalt, nickel and manganese. Appropriate dopings for use with a silicon semiconductor material, and whose use also depends on the spectral response desired, are boron, galium, indium, aluminum, zinc and gold. This list is not to be construed in a limiting sense. With the target surface layer provided in accordance with the present invention nearly all known dopings of silicon and germanium, for example, become potential camera tube materials.

While we have shown and described several embodiments of our invention it will be apparent to those skilled in the art that many other changes and modifications may be made without departing from our invention in its broader aspects and we therefore intend the appended claims to cover all such changes and modifications as fall within the true spirit and scope of our invention.

What we claim as new and desire to secure by Letters Patent of the United States is:

1. The method of depolarizing the surface of semiconductor photoconductive camera tube target having a front side for viewing a scene so that current may be conducted by an electron beam scanning the back side of said target and through said target without being impeded by a dipole surface layer on the target, comprising the steps of adding a material operative when added to the semiconductor to impart p-type conductivity characteristics thereto, and bombarding the side of the target which is to be scanned by the electron beam with a stream of noble gas ions in order to increase acceptor levels in the semiconductor surface and render the surface comparably p-type with the interior of the semiconductor.

2. The method of manufacturing a target for a photoconductive type camera tube employing a scanning electron beam which comprises forming a target shape from a flat wafer of exerinsic semiconductor material, and subjecting the face of said target wafer which is to be scanned by an electron beam with bombardment by noble gas ions in order to alter the polarity characteristics of the wafer face wherein said bombardment comprises orienting said face opposite an electrode of similar proportions and of negative polarity relative to said face in a noble gas atmosphere, applying a voltage on the order of 250 to 600 volts between said face and said electrode, and spacing said electrode to carry a discharge to said face on the order of from 1 to 5 milliamperes per square centimeter.

3. The method of claim 2 wherein said noble gas ions are helium ions.

4. The method of manufacturing a target for a photoconductor camera tube employing a scanning electron beam including the steps of adding an impurity to an n-type body of semiconductor material, said impurity being operative when added to the semiconductor to impart p-type conductivity characteristics thereto, and subjecting a surface of said body that is to be scanned to ion glow bombardment in order to render the target surface comparably p-type with the interior of the semiconductor and thereby prevent a non-imaging state in the tube.

5. The method of manufacturing a camera tube target from semiconductor material initially of the n-type including the steps of coating a body of semiconductor material with an acceptor-type impurity metal, heating the coated body for causing the metal to diffuse into the semiconductor, removing at least a face of the body leaving a surface for a contact point on another part of the body, spacing an electrode opposite said face in an atmosphere of noble gas and applying a voltage between said contact point and said electrode for causing noble gas ions to bombard said face.

6. The method of claim 5 where the metal added to the semiconductor is of a comparable atomic percentage for balancing the initial n-type impurity.

7. The method of claim 6 where said metal is copper and the semiconductor is initially doped with an element from the group consisting of arsenic and antimony.

8. The method of manufacturing a camera tube target from a semiconductor material including the steps of coating a body of initially n-type germanium semiconductor material with an acceptor-type impurity metal consisting of copper, heating the coated body to cause the metal to diffuse into the semiconductor, removing said metal and a part of the semiconductor material thereunder leaving a contact area on said semiconductor material, and subjecting a portion of said body of semiconductor material where said metal has been removed to bombardment with ions.

9. The method of claim 8 wherein said metal is copper, said semiconductor is germanium and includes an initial n-type impurity selected from the group consisting of arsenic and antimony.

10. A method of manufacturing a camera tube target from a semiconductor material to have a depolarized back surface for scanning with an electron beam, including the steps of coating a body of initially n-type semiconductor material with an acceptor-type impurity metal, heating the coated body to cause the metal to diffuse into the semiconductor, removing at least a face layer of the body for forming said back surface leaving another face for a contact area on at least another part of the body, establishing electrical connection with the said contact point, and bombarding the said back surface with noble gas ions directed to the said face, using the said contact area as a point of reference potential.

11. A method of manufacturing a semiconductor target electrode for a radiant energy discharge device one side of which is to receive intelligence and the other side of which is to receive radiant energy in said device comprising the steps of placing a side of the target electrode which is intended to receive a discharge of radiant energy in the said device opposite a source of noble gas ions, and bombarding the said side of the target electrode with said ions to improve the surface polarity characteristics of the said target, said ions being driven towards said target with a higher momentum than would be encountered in said discharge device.

References Cited

UNITED STATES PATENTS

| | | | |
|---|---|---|---|
| 2,875,505 | 3/1959 | Pfan | 29—25.3 |
| 2,906,002 | 9/1959 | Nagorsen et al. | 29—25.3 |
| 2,910,602 | 10/1959 | Lubszynski et al. | 313—65 |
| 2,967,254 | 1/1961 | Forgue | 313—65 |

FOREIGN PATENTS

| | | |
|---|---|---|
| 548,523 | 11/1957 | Canada. |

OTHER REFERENCES

Physical Review, vol. 94, No. 2, Apr. 15, 1954, pp. 278–281.

Physical Review, vol. 93, No. 1, Jan. 1, 1954, pp. 65–68.

Physical Review, vol. 96, No. 4, Nov. 15, 1954, pp. 874–882.

Physical Review, vol. 93, No. 5, Mar. 1, 1954, pp. 977–980.

Physical Review, vol. 97, No. 3, Feb. 1, 1955, pp. 614–622 and 669–672.

Physical Review, vol. 100, No. 2, Oct. 15, 1955, pp. 659–662.

STEPHEN C. BENTLEY, Primary Examiner